United States Patent
Wolfram et al.

(10) Patent No.: US 10,656,703 B2
(45) Date of Patent: May 19, 2020

(54) VISUAL DISPLAY TECHNIQUES FOR MITIGATING LATENCY

(71) Applicant: WOLFRAM ALPHA LLC, Champaign, IL (US)

(72) Inventors: Stephen Wolfram, Concord, MA (US); Jeremy Davis, Mahomet, IL (US); Edward Pegg, Jr., Champaign, IL (US)

(73) Assignee: Wolfram Alpha LLC, Champaign, IL (US)

( * ) Notice: Subject to any disclaimer, the term of this patent is extended or adjusted under 35 U.S.C. 154(b) by 1036 days.

(21) Appl. No.: 13/891,990

(22) Filed: May 10, 2013

(65) Prior Publication Data
US 2013/0339893 A1    Dec. 19, 2013

Related U.S. Application Data

(60) Provisional application No. 61/645,617, filed on May 10, 2012, provisional application No. 61/646,057, filed on May 11, 2012.

(51) Int. Cl.
G06F 11/32       (2006.01)
G06F 3/01        (2006.01)
G06F 3/0484      (2013.01)
G06Q 10/06       (2012.01)

(52) U.S. Cl.
CPC ............... *G06F 3/01* (2013.01); *G06F 11/324* (2013.01); *G06F 3/0484* (2013.01); *G06F 3/04847* (2013.01); *G06F 2201/86* (2013.01); *G06Q 10/063114* (2013.01)

(58) Field of Classification Search
CPC ............... G06F 3/0484; G06F 3/04847; G06F 2201/86; G06F 2201/875; G06F 11/32; G06F 11/324
USPC ........................................................ 715/772
See application file for complete search history.

(56) References Cited

U.S. PATENT DOCUMENTS

| | | | |
|---|---|---|---|
| 5,301,348 A * | 4/1994 | Jaaskelainen | G06F 3/0481 345/469.1 |
| 5,953,010 A * | 9/1999 | Kampe | G06F 9/4443 715/772 |
| 7,560,636 B2 | 7/2009 | Wolfram | |
| 8,589,869 B2 | 11/2013 | Wolfram | |
| 8,620,708 B2 * | 12/2013 | Miyake | G06Q 10/06 345/419 |
| 9,213,768 B1 | 12/2015 | Wolfram et al. | |
| 2008/0066052 A1* | 3/2008 | Wolfram | G06F 8/30 717/109 |
| 2008/0195948 A1* | 8/2008 | Bauer | G06F 3/048 715/719 |
| 2009/0113334 A1* | 4/2009 | Chakra | G06F 9/4443 715/772 |

(Continued)

*Primary Examiner* — Rinna Yi
(74) *Attorney, Agent, or Firm* — Faegre Drinker Biddle & Reath LLP

(57) ABSTRACT

A visual display that changes with time and/or an audio signal is rendered while a task is being completed by a computing device (e.g., performing a computation, retrieving information, powering up a device, starting a computer application, etc.). The visual display and/or audio signal are configured to engage the user in order to mitigate latency of the task. Because the user is being engaged by the visual display and/or audio signal, the user may be less likely to notice and/or be bothered by the latency.

26 Claims, 7 Drawing Sheets

(56) References Cited

U.S. PATENT DOCUMENTS

2010/0302129 A1* 12/2010 Kastrup ............... G06F 3/1446
345/1.3

* cited by examiner

VISUAL DISPLAY TECHNIQUES FOR MITIGATING LATENCY

CROSS-REFERENCE TO RELATED APPLICATIONS

The present application claims the benefit of U.S. Provisional Application No. 61/646,057, filed May 11, 2012, entitled "Visual Display Techniques for Mitigating Latency," and U.S. Provisional Application No. 61/645,617, filed May 10, 2012, entitled "Visual Display Techniques for Mitigating Latency." Both of the applications referenced above are incorporated by reference herein in their entireties.

FIELD OF THE DISCLOSURE

The present application relates generally to user interfaces and, more particularly, to displaying information while a user waits for a task to be completed.

BACKGROUND

Software applications and electronic devices often display images while completing a task to indicate to a user that the task in the process is in the process of being completed. This may help the user to distinguish from a computer crash or a glitch in which a request from the user to perform a task is seemingly ignored.

For example, an installation program may display a bar that gradually fills from left to right to indicate to the user how much of the installation process has been completed. The bar may also provide to the user an expectation of how much longer the installation process will take. Similarly, a web browser may display a bar that gradually fills from left to right to indicate to the user how much of the process of requesting, retrieving, and loading of a web page or file has been completed.

As another example, an application may change an icon to a shape such as an hour glass that flips to indicate that the computer is working on a task. As another example, an application may display a ring that appears to spin to indicate that the computer is working on a task.

SUMMARY

In various embodiments described below, a visual display that changes with time and/or an audio signal is rendered while a task is being completed by a computing device (e.g., performing a computation, retrieving information, powering up a device, starting a computer application, etc.). The visual display and/or audio signal are configured to engage the user in order to mitigate latency of the task. In other words, because the user is being engaged by the visual display and/or audio signal, the user may be less likely to notice and/or be bothered by the latency.

In one embodiment, a method includes, in response to different tasks being performed, generating, with a computing device, a plurality of different visual displays corresponding to the different tasks. The method also includes rendering on a display device each of the visual displays while each respective task is being performed. Each visual display changes with time as the visual display is rendered and each visual display is configured to engage a viewer of the visual display in order to distract the viewer from the amount of time passing while the respective task is being performed.

In other embodiments, the method includes any combination of one or more of the following elements.

The method further includes selecting, with the computing device and for each visual display to be generated, one or both of (i) a rule for generating the visual display, and (ii) initial conditions for the rule.

Selecting one or both of (i) the rule and (ii) the initial conditions for each visual display is based on data associated with the respective task to be performed.

Selecting one or both of (i) the rule and (ii) the initial conditions for each visual display is based on respective user input indicating the respective task to be performed.

Selecting one or both of (i) the rule and (ii) the initial conditions for each visual display comprises applying a hash function to the respective user input to generate a respective hash value, and selecting one or both of (i) the rule and (ii) the initial conditions for the visual display based on the respective hash value.

One or both of (i) the rule and (ii) the initial conditions are randomly or pseudo-randomly selected for each visual display.

The method further includes, for each visual display to be generated, electronically receiving, from a computing system communicatively coupled to the computing device via a network, one or both of (i) a rule for generating the visual display, and (ii) initial conditions for the rule.

The task is a computing task performed by the computing device. The task is performed by a computing system separate from the computing device.

Each visual display is generated using a rule. All of the visual displays are generated using the same rule. At least some of the visual displays are generated using different rules. The rule comprises a cellular automaton.

In another embodiment, an apparatus comprises a hardware processor configured to, in response to different tasks being performed, generate a plurality of different visual displays corresponding to the different tasks. Each visual display is to be rendered on a display device while each respective task is being performed. Each visual display changes with time as the visual display is rendered and each visual display is configured to engage a viewer of the visual display in order to distract the viewer from the amount of time passing while the respective task is being performed.

In other embodiments, the apparatus includes any combination of one or more of the following features.

The hardware processor is configured to select, for each visual display to be generated, one or both of (i) a rule for generating the visual display, and (ii) initial conditions for the rule.

The hardware processor is configured to select one or both of (i) the rule and (ii) the initial conditions for each visual display based on data associated with the respective task to be performed.

The hardware processor is configured to select one or both of (i) the rule and (ii) the initial conditions for each visual display based on respective user input indicating the respective task to be performed.

The hardware processor is configured to apply a hash function to the respective user input to generate a respective hash value, and select one or both of (i) the rule and (ii) the initial conditions for the visual display based on the respective hash value.

The hardware processor is configured to select, for each visual display, one or both of (i) the rule and (ii) the initial conditions randomly or pseudo-randomly.

The apparatus further comprises a network interface configured to couple with a communication network, and the hardware processor is configured to utilize, for generating each visual display, one or both of (i) a rule for generating the visual display, and (ii) initial conditions for the rule electronically received via the communication network.

The apparatus further comprises the display device, and the hardware processor is configured to render each visual display on the display device while the respective task is being performed.

The hardware device comprises one or memories to store machine readable instructions, and one or more processors configured to execute machine readable instructions stored in the one or more memories.

In another embodiment, a method includes electronically receiving, from a computing system communicatively coupled to a computing device via a network, one or both of (i) a rule for generating a visual display, and (ii) initial conditions for the rule. The method also includes generating, with the computing device, the visual display using the rule and the initial conditions, and rendering on a display device the visual display while a task is being performed.

In other embodiments, the method includes any combination of one or more of the following features.

The visual display changes with time as the visual display is rendered and the visual display is configured to engage a viewer of the visual display in order to distract the viewer from the amount of time passing while the task is being performed.

The method further comprises electronically transmitting to the computing system, via the network, an indication of the task, and one or both of (i) the rule and (ii) the initial conditions are related to the task.

The indication of the task is a query, and the task is to generate a response to the query. One or both of (i) the rule and (ii) the initial conditions are generated using the query.

The task is performed by the computing system separate from the computing device.

The method further comprises ending the rendering of the visual display when the task is completed.

In yet another embodiment, an apparatus comprises a display device, a network interface configured to communicatively couple to a network, and a hardware processor coupled to the network interface. The hardware processor configured to generate a visual display using a rule and initial conditions for the rule, wherein one or both of the rule and the initial conditions are received via the network, and render on the display device the visual display while a task is being performed.

In other embodiments, the apparatus comprises any combination of one or more of the following features.

The visual display changes with time as the visual display is rendered and the visual display is configured to engage a viewer of the visual display in order to distract the viewer from the amount of time passing while the task is being performed.

The hardware processor is configured to cause the network interface to electronically transmit to the computing system, via the network, an indication of the task, and one or both of (i) the rule and (ii) the initial conditions are related to the task.

The indication of the task is a query, and the task is to generate a response to the query. One or both of (i) the rule and (ii) the initial conditions are generated using the query.

The task is performed by the computing system separate from the computing device.

The hardware processor is configured to end the rendering of the visual display when the task is completed.

The hardware device comprises one or memories to store machine readable instructions, and one or more processors configured to execute machine readable instructions stored in the one or more memories.

In still another embodiment, a method includes electronically receiving, at a computing system, an indication of a task to be performed, and selecting, with the computing system, one or both of (i) a rule for generating a visual display, and (ii) initial conditions for the rule. The method also includes electronically transmitting, with the computing system, one or both of (i) the rule, and (ii) initial conditions for the rule.

In other embodiments, the method includes any combination of one or more of the following features.

The rule is configured such that the visual display generated with the rule changes with time as the visual display is rendered and the visual display is configured to engage a viewer of the visual display in order to distract the viewer from the amount of time passing while the task is being performed.

Selecting one or both of (i) the rule and (ii) the initial conditions for the visual display is based on data associated with the task to be performed.

Selecting one or both of (i) the rule and (ii) the initial conditions for the visual display is based on the received indication of the task to be performed.

Selecting one or both of (i) the rule and (ii) the initial conditions for the visual display comprises applying a hash function to the received indication to generate a hash value, and selecting one or both of (i) the rule and (ii) the initial conditions for the visual display based on the hash value.

One or both of (i) the rule and (ii) the initial conditions are randomly or pseudo-randomly selected.

In yet another embodiment, an apparatus comprises a network interface configured to communicatively couple to a network, and a hardware processor coupled to the network interface. The hardware processor is configured to receive an indication of a task to be performed, the indication electronically received via the network. The hardware processor is also configured to select one or both of (i) a rule for generating a visual display, and (ii) initial conditions for the rule, and cause the network interface to electronically transmit one or both of (i) the rule, and (ii) initial conditions for the rule.

In other embodiments, the apparatus includes one or more of the following features.

The rule is configured such that the visual display generated with the rule changes with time as the visual display is rendered and the visual display is configured to engage a viewer of the visual display in order to distract the viewer from the amount of time passing while the task is being performed.

The hardware processor is configured to select one or both of (i) the rule and (ii) the initial conditions for the visual display based on data associated with the task to be performed.

The hardware processor is configured to select one or both of (i) the rule and (ii) the initial conditions for the visual display based on the received indication of the task to be performed.

The hardware processor is configured to apply a hash function to the received indication to generate a hash value, and select one or both of (i) the rule and (ii) the initial conditions for the visual display based on the hash value.

The hardware processor is configured to randomly or pseudo-randomly select one or both of (i) the rule and (ii) the initial conditions.

The hardware device comprises one or memories to store machine readable instructions, and one or more processors configured to execute machine readable instructions stored in the one or more memories.

DETAILED DESCRIPTION

In various embodiments described below, a visual display that changes with time and/or an audio signal is rendered while a task is being completed by a computing device (e.g., performing a computation, retrieving information, powering up a device, starting a computer application, etc.). The visual display and/or audio signal are configured to engage the user in order to mitigate latency of the task. In other words, because the user is being engaged by the visual display and/or audio signal, the user may be less likely to notice and/or be bothered by the latency.

For example, while being rendered, the visual display and/or audio signal may exhibit both order and apparent randomness or complexity (e.g., within the visual display and/or audio signal being rendered, there may be localized structures that appear ordered and simple, but such structures may move, change and/or interact with other structures in complicated ways that appear random or unexpected), in some embodiments. As another example, the visual display and/or audio signal may be different each time it is rendered to the user, in some embodiments. As another example, each time the visual display and/or audio signal is to be rendered to a user, a different visual display and/or audio signal may be selected from a large set of different visual displays and/or audio signals such that the probability of selecting the same visual display and/or audio signal in close succession is suitably low, in some embodiments. As another example, the visual display and/or audio signal may be selected and/or generated based on a user input associated with the task to be performed such that (i) different user inputs result in different visual displays and/or audio signals and/or (ii) the probability that different user inputs in close succession result in the same visual display and/or audio signal is suitable low, in some embodiments.

Figure 1:
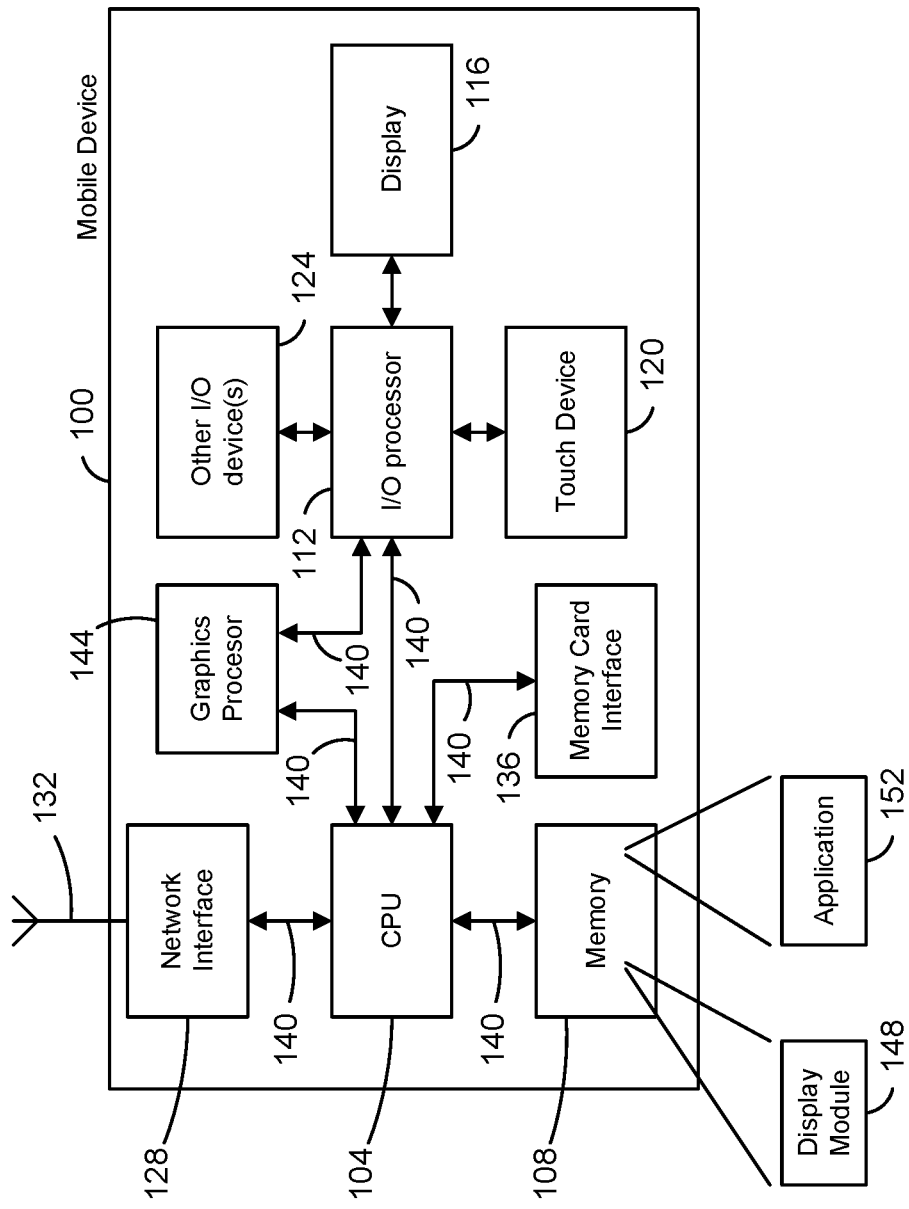
FIG. 1 a block diagram of an example computing device configured to implement display/audio rendering techniques described herein, in an embodiment.

FIG. 1 is a diagram of an example mobile computing device 100 which may implement a display module configured to generate and render a visual display that changes with time while a task is being completed by the computing device 100 (e.g., performing a computation, retrieving information, powering up the computing device 100, establishing a communication session with another computing device, starting a computer application, etc.) or being completed some other computing device such as a server, a computer, an electronic appliance, etc. As discussed above, the visual display is configured to engage the user in order to mitigate latency of the task.

The device 100 includes a central processing unit (CPU) 104 coupled to a memory 108 (which can include one or more computer readable storage media such as random access memory (RAM), read only memory (ROM), FLASH memory, a hard disk drive, a digital versatile disk (DVD) disk drive, a Blu-ray disk drive, etc.). The device also includes an input/output (I/O) processor 112 that interfaces the CPU 104 with a display device 116 and a touch-sensitive device or touchscreen 120 (e.g., a single-touch or multi-touch touchscreen). The I/O processor 112 also may interface one or more additional I/O devices 124 to the CPU 104, such as one or more buttons, click wheels, a keyboard, a keypad, a touch pad, another touchscreen (single-touch or multi-touch), lights, a speaker, a microphone, etc.

A network interface 128 is coupled to the CPU 104 and to one or more antennas 132. A memory card interface 136 is coupled to the CPU 104. The memory card interface 136 is adapted to receive a memory card such as a secure digital (SD) card, a miniSD card, a microSD card, a Secure Digital High Capacity (SDHC) card, etc., or any suitable card.

The CPU 104, the memory 108, the I/O processor 112, the network interface 128, and the memory card interface 136 are coupled to one or more busses 140. For example, the CPU 104, the memory 108, the I/O processor 112, the network interface 128, and the memory card interface 136 are coupled to a single bus 140, in an embodiment. In another embodiment, the CPU 104 and the memory 108 are coupled to a first bus, and the CPU 104, the I/O processor 112, the network interface 128, and the memory card interface 136 are coupled to a second bus. In other embodiments, more than two busses are utilized.

The device 100 also may include a graphics processor 144 coupled to the display 116 and to the CPU 104. The graphics processor 144 may be coupled to the display 116 via the I/O processor 112. The graphics processor 144 may be coupled to the CPU 104 and the I/O processor 112 via one or more busses 140.

In embodiments in which the CPU 104 executes a display module 148, the display module 148 may be stored in the memory 108. In embodiments in which the graphics processor 144 executes the display module 148, display module 148 may be stored in the memory 108 and/or in another memory (not shown) of or coupled to the graphics processor 144. In some embodiments, the memory 108 is coupled to the graphics processor 144.

The display module 148 includes machined readable instructions that, when executed by a processor (such as the CPU 104 and/or the graphics processor 144), cause (i) the processor to generate and (ii) the display device 116 to display a visual display that changes with time while a task is being completed by the computing device 100 or some other computing device.

The display module 148 is executed to render the visual display in connection with the task being performed, in an embodiment. For example, in an embodiment, the display module 148 is started or launched in response to the task being initiated. In another embodiment, rendering of the visual display is begun by the display module 148, already being executed, in response to the task being initiated. Embodiments of the visual display are described in more detail below.

The device 100 is only one example of a mobile computing device 100, and other suitable devices can have more or fewer components than shown, can combine two or more components, or a can have a different configuration or arrangement of the components. The various components shown in FIG. 1 can be implemented in hardware, a processor executing software or firmware instructions or a combination of both hardware and a processor executing software or firmware instructions, including one or more signal processing and/or application specific integrated circuits.

The CPU 104 executes computer readable instructions stored in the memory 108. The I/O processor 112 interfaces the CPU 104 with input and/or output devices, such as the display 116, the touch screen 120, and other input/control devices 124. Similarly, the graphics processor 144 executes computer readable instructions stored in the memory 108 or another memory (not shown) associated with the graphics processor 144. The I/O processor 112 interfaces the graphics processor 144 with the display 116 and, optionally other input/control devices.

The I/O processor 112 can include a display controller (not shown) and a touchscreen controller (not shown). The touchscreen 120 includes one or more of a touch-sensitive surface and a sensor or set of sensors that accepts input from the user based on haptic and/or tactile contact. The touchscreen 120 utilizes one or more of currently known or later developed touch sensing technologies, including one or more of capacitive, resistive, infrared, and surface acoustic wave technologies, as well as other proximity sensor arrays or other elements for determining one or more points of contact with the touchscreen 120. The touchscreen 120 and the I/O processor 112 (along with any associated modules and/or sets of instructions stored in memory 102 and executed by the CPU 104) can detect one or more points of or instances of contact (and any movement or breaking of the contact(s)) on the touchscreen 120, in some embodiments. Such detected contact can be converted by the CPU 104 into interaction with a user-interface mechanism that is displayed on the display 116. A user can make contact with the touchscreen 120 using any suitable object or appendage, such as a stylus, a finger, etc.

The network interface 128 facilitates communication with a wireless communication network such as a mobile communications network, a wireless local area network (WLAN), a wide area network (WAN), a personal area network (PAN), etc., via the one or more antennas 132. In other embodiments, one or more different and/or additional network interfaces facilitate wired communication with one or more of a local area network (LAN), a WAN, another computing device such as a personal computer, a server, etc.

Software components or modules (i.e., sets of computer readable instructions executable by the CPU 104) are stored in the memory 108 and/or a separate memory (not shown) associated with the graphics processor. The software components can include an operating system, a communication module, a contact module, a graphics module, and applications such as a computational application, a data processing application, etc. The operating system can include various software components and/or drivers for controlling and managing general system tasks (e.g., memory management, etc.) and can facilitate communication between various hardware and software components. The communication module can facilitate communication with other devices via the network interface 128.

The contact module can detect contact with the touchscreen 120 (in conjunction with the I/O processor 112). The contact module can include various software components for performing various operations related to detection of contact, such as determining if contact has occurred, determining if there is movement of the contact and tracking the movement across the touchscreen 120 (in some embodiments), and determining if the contact has been broken (i.e., if the contact has ceased). Determining movement of the point of contact can include determining speed (magnitude), velocity (magnitude and direction), and/or an acceleration (a change in magnitude and/or direction) of the point of contact. These operations can be applied to single contacts (e.g., one finger contacts) or to multiple simultaneous contacts (e.g., "multi-touch"/multiple finger contacts), in some embodiments.

The graphics module can include various suitable software components for rendering and displaying graphics objects on the display 116. As used herein, the term "graphics" includes any object that can be displayed to a user, including without limitation text, web pages, icons, symbols, digital images, etc. The display module 148 may be included within the graphics module or may be separate from the graphics module.

An application module 152, stored in the memory 108, may, when executed by the CPU 104, interact with the display module 148. For example, when the application module 152 is an application for performing computations, the application module 152 may cause the display module 148 to render a visual display, as discussed above, while the application module 152 performs a computation and may cause the display module 148 to stop rendering the visual display when the computation is completed. As another example, when the application module 152 is a web browser, the application module 152 may cause the display module 148 to render a visual display, as discussed above, while a web page is being loaded, while waiting for a response from a server, etc., and may cause the display module 148 to stop rendering the visual display when the web page completed loading, the response from the server has been received, etc. As another example, when the application module 152 is a database application, the application module 152 may cause the display module 148 to render a visual display, as discussed above, during a database search and may cause the display module 148 to stop rendering the visual display when the database search is completed. As another example, when the application module 152 is part of the operating system, the application module 152 may cause the display module 148 to render a visual display, as discussed above, during a booting or startup process and may cause the display module 148 to stop rendering the visual display when the booting or startup process is completed.

Each of the above identified modules and applications can correspond to a set of instructions that, when executed by a processor, cause one or more functions described above to be implemented. These modules need not be implemented as separate software programs, procedures or modules, and thus various subsets of these modules can be combined or otherwise re-arranged in various embodiments. In some embodiments, the memory 108 (and separate memory associated with the graphics processor, when included) stores a subset of the modules and data structures identified above. In other embodiments, the memory 108 (and separate memory associated with the graphics processor, when included) stores additional modules and data structures not described above.

In various examples and embodiments described below, displays and user interfaces are described with reference to the device 100 of FIG. 1 for ease of explanation. In other embodiments, another suitable device different than the device 100 is utilized to display displays and user interfaces. For example, other suitable devices include desktop computers, servers, etc.

Figure 2:
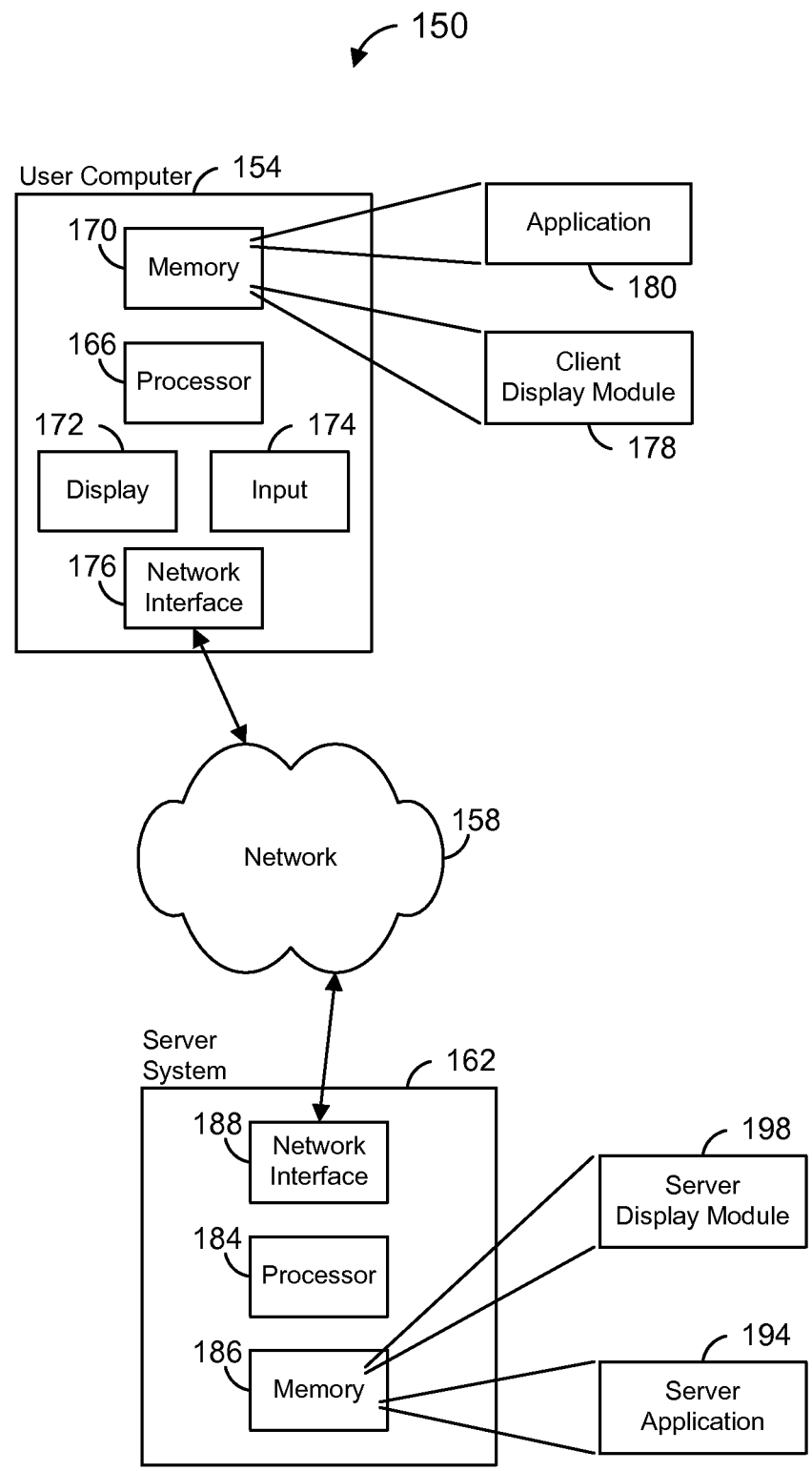
FIG. 2 a block diagram of an example system configured to implement display/audio rendering techniques described herein, in an embodiment.

FIG. 2 is a diagram of an example system 150 which may implement a display module configured to generate and render a visual display that changes with time while a task is being completed, according to another embodiment.

A user computer 154 is configured to implement a client display module alone, in one embodiment, or in conjunction with a server system 162, in another embodiment. In embodiments that include the server system 162, the user computer 154 is communicatively coupled to a communication network 158 including, for example, one or more of the Internet, an intranet, an extranet, a mobile communications network, etc., and the server system 162 is also communicatively coupled to the network 108. In embodiments that include the server system 162, the user computer 154 is configured to communicate with the server system 162 via the network 158. For example, the user computer 154 may send to the server system 162 data indicative of (i) a requested web page, (ii) a request to perform a computation, (iii) a request to perform an Internet search, (iv) a request to perform a database search, etc., in various embodiments. The server system 162 may be configured to analyze the user input from the user computer 154 and to perform a requested task in response to the user input. For example, the server system 162 may be configured to (i) serve a requested web page, (ii) perform a requested computation, (iii) perform a requested Internet search, (iv) perform a requested database search, etc., in various embodiments. The server system 162 may be configured to transmit electronically to the user computer 154, via the network 158, the results of the performed task. For example, the server system 162 may be configured to transmit (i) a requested web page, (ii) results of a requested computation, (iii) results of a requested Internet search, (iv) results of a requested database search, etc., in various embodiments.

The user computer 154 may be a computing device such as a desktop computer, a gaming system, a tablet computer, a smart phone, etc. The user computer 154 may include one or more processors 166 (e.g., a CPU and/or a graphics processor), one more memory devices 170 (e.g., random access memory (RAM), read only memory (ROM), FLASH memory, a magnetic disk, an optical disk, etc.), one or more display devices 172 (e.g., integral display device and/or external display device), and one or more input devices 174, such as a keyboard, a keypad, a button, a mouse, a trackball, a touch screen, a multi-touch screen, a touch pad, etc. The user computer 154 may include a network interface 176 to communicatively couple the user computer 154 to the network 158. At least some of the one or more processors 166, the one or more memory devices 170, the one or more display devices 172, the one or more input devices 174, and the network interface 176 may be communicatively coupled together via one or more busses (not shown), cords (not shown), etc.

The one or more memory devices 170 may store all or a portion of a client display module 178. The client display module 178, when executed by the one or more processors 166, may render a visual display that changes with time while a task is being completed by the user computer 154 (e.g., performing a computation, retrieving information, powering up the user computer 154, establishing a communication session with another computing device (e.g., the server system 162), starting a computer application, etc.) or being completed by some other computing device such as the server system 162, another computer (not shown), an electronic appliance (not shown), etc. As will be discussed in more detail below, the client display module 178 may generate the visual display using information received from the server system 162, in some embodiments in which the server system 162 is included.

An application module 180, stored in the memory 170, may, when executed by the one or more processors 166, interact with the display module 178. For example, when the application module 180 is an application related to performing computations, the application module 180 may cause the display module 178 to render a visual display, as discussed above, while the computation is being performed and may cause the display module 178 to stop rendering the visual display when the computation is completed. As another example, when the application module 180 is a web browser, the application module 180 may cause the display module 178 to render a visual display, as discussed above, while a web page is being loaded, while waiting for a response from the server system 162, etc., and may cause the display module 178 to stop rendering the visual display when the web page completed loading, the response from the server system 162 has been received, etc. As another example, when the application module 180 is a database application, the application module 180 may cause the display module 178 to render a visual display, as discussed above, during a database search and may cause the display module 178 to stop rendering the visual display when the database search is completed. As another example, when the application module 180 is part of the operating system, the application module 180 may cause the display module 178 to render a visual display, as discussed above, during a booting or startup process and may cause the display module 178 to stop rendering the visual display when the booting or startup process is completed.

In an embodiment, the application 180 may comprise a front end system that interfaces with a kernel implemented by the server system 162. In this embodiment, the front end system implemented by the user computer 154 may receive user input corresponding to functions commands, instructions, etc., and forward the user input to the server system 162. The kernel implemented on the server system 162 may then execute or interpret the entered functions, commands, instructions, etc., and perform corresponding numerical and/or symbolic calculations to generate corresponding results. The server system 162 may then transmit the results to the user computer 154, and the front end system implemented by the user computer 154 may then display the results in the electronic worksheet, spreadsheet, workbook, etc. In an embodiment, the application 180 may cause the display module 178 to render a visual display, as discussed above, while waiting for results from the server system 162.

In one embodiment, the server system 162 may implement a computational application, and a user may utilize the computational application by way of a web browser application 180 implemented by the user computer 154. In this embodiment, the user computer 154 may receive user input corresponding to functions commands, instructions, etc. entered by the user by way of a web page that includes one or more user interface mechanisms for entering input related to a computation to be performed. In one embodiment, the web page includes a mechanism for entering a natural language query specifying a computation to be performed. In other embodiments, a web page corresponds to an electronic worksheet, a spreadsheet, a workbook, etc.

Input entered by the user is forwarded to the server system 162. The computational application implemented on the server system 162 may then execute or interpret the entered functions, commands, instructions, etc., and perform corresponding numerical and/or symbolic calculations to generate corresponding results. The server system 162 may then generate a web page to display the results, in an embodiment. In other embodiments, the server system 162 may generate an updated electronic worksheet, spreadsheet, workbook, etc., that includes the results. The results are transmitted by the server system 162 to the user computer 154. In some embodiments, the results are transmitted by the server system 162 to the user computer 154 as a web page, for example. A web browser implemented by the user computer 154 may then display the results. In some embodiments, a web page corresponds to an updated electronic worksheet, spreadsheet, workbook, etc., that includes the results.

The server system 162 may comprise one or more computing devices such as a desktop computer, a server, a mainframe, etc. The server system 162 may include one or more processors 184, one more memory devices 186 (e.g., RAM, ROM, FLASH memory, a magnetic disk, an optical disk, a database system, etc.), and a network interface 188 to communicatively couple the server system 162 to the network 158. At least some of the one or more processors 184, the one or more memory devices 186, and the network interface 188 may be communicatively coupled together via one or more of 1) one or more busses, 2) one or more networks (e.g., a local area network (LAN), a wide area network (WAN), etc.) 3) point-to-point communication links, 4) cords, etc. (not shown).

The one or more memory devices 186 may store a server application 194 that is executed by the one or more processors 184. The server application 194 may comprise a web server application, an Internet search engine application, a database search engine application, a computational application, etc., in various embodiments.

In one embodiment, the server application 194 comprises a computational application that, when executed by the one or more processors 194, may perform numerical, graphical, and/or symbolic calculations corresponding to functions, commands, instructions, etc., entered by the user as a natural language query. For example, in one embodiment, the server system 162 implements a system such as described in U.S. patent application Ser. No. 11/852,044, filed on Sep. 7, 2007, and/or in U.S. patent application Ser. No. 12/780,685, filed on May 14, 2010.

In another embodiment, the server application 194 comprises a computational application that, when executed by the one or more processors 194, may perform numerical, graphical, and/or symbolic calculations corresponding to functions, commands, instructions, etc., entered by the user in an electronic worksheet, spreadsheet, workbook, etc. For example, the server application 194 may execute or interpret the functions, commands, instructions, etc., received from the user computer 154, and perform corresponding numerical and/or symbolic calculations to generate corresponding results. In embodiments in which the server system 162 implements a kernel of a computational application, the server application 194 may cause the server system 162 to transmit the results to the user computer 154 via the network 158. In embodiments in which the server system implements a full computational application 194, which the computational application 194 may generate an updated electronic worksheet, spreadsheet, workbook, etc., that includes the results as a web page, for example, and may cause the server system 162 to transmit the web page to the user computer 154 via the network 158.

The one or more memory devices 186 may store a server display module 198 that is executed by the one or more processors 184. The server display module 198 may provide information for use by the client display module 178 in generating the visual display discussed above. For example, information generated by the server display module 197 may be transmitted by the server system 162 to the user computer 154. For example, the server display module 198 may provide information that, when utilized by the client display module 178 to generate the visual display, will result in a visual display that exhibits both order and apparent randomness or complexity while being rendered, in some embodiments. As another example, the server display module 198 may provide information that, when utilized by the client display module 178 to generate the visual display, will result in a visual display that may be different each time it is rendered to the user, in some embodiments. As another example, the server display module 198 may select a different visual display from a large set of different visual displays and provide information that, when utilized by the client display module 178, will result in the client display module 178 generating the selected display, in an embodiment. In some embodiments, the size of set of different visual displays is such that the probability of selecting the same visual display in close succession is suitably low.

As another example, the server display module 198 may utilize user input to generate visual display information, in an embodiment. The user input may include or correspond to information entered or requested by the user via the computer 154 (e.g., a natural language, an Internet search query, a web page request, a request for a particular computation to be performed, etc.) and transmitted by the user computer 154 to the server system 162. The server display module 198 may provide the generated visual display information to the user computer 154 such that, when utilized by the client display module 178 to generate the visual display, will result in visual displays in which (i) different user inputs result in different visual displays and/or (ii) the probability that different user inputs in close succession result in the same visual display is suitable low, in some embodiments.

Figure 3A:
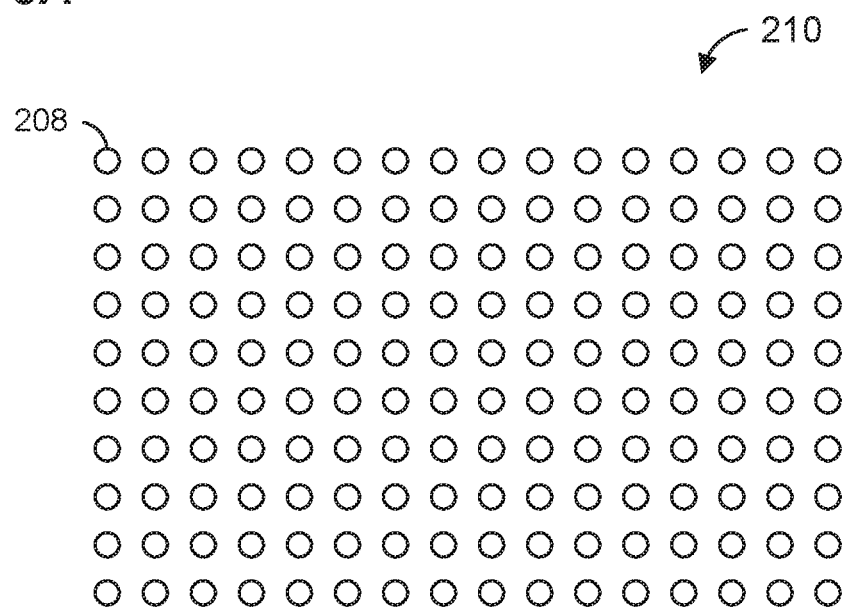
FIG. 3A is a diagram of an example visual display format, according to an embodiment.

FIG. 3A is a diagram of an example visual display format 210 that is utilized in some embodiments. The visual display format 210 includes a plurality of elements 208 arranged in a rectangular array. In one embodiment, the array has dimensions that are generally consistent with a golden rectangle. In other embodiments, the array has suitable dimensions that differ from that of a golden rectangle. The array may be included in a window, a web page, etc.

In some embodiments, each element 208 is generally circular in shape. In other embodiments, each element 208 is of another suitable shape, such as a square, an octagon, an oval, etc. In an embodiment, each element 208 can be in one of three states: (i) OFF, (ii) ON, or (iii) DYING. An algorithm is utilized to change states of the elements 208 over time such that the display 210 exhibits both order and apparent randomness or complexity (e.g., within the visual display 210, there may be localized structures, for example, localized structures 302 and 304 of FIG. 3B, that appear ordered and simple, but such structures may move, change and/or interact with other structures in complicated ways that appear random or unexpected), in some embodiments.

In the OFF state, the element 208 is at a lowest level of brightness from a set of brightness levels, in an embodiment. For example, in one embodiment, an element 208 in the OFF state cannot be seen, e.g., the element 208 has the same color as a background on which the display 210 is located. As another example, in another embodiment, an element 208 in the OFF state is very faint. In the ON state, the element 208 is at a medium level of brightness from the set of brightness levels, in an embodiment. In the DYING state, brightness of the element 208 gradually increases from the medium level of brightness to a maximum level of brightness from the set of brightness levels, and then gradually fades until reaching the minimum level of brightness, in an embodiment. In an embodiment, after or upon reaching the minimum level of brightness, an element 208 in the DYING state automatically transitions to the OFF state.

In an embodiment, elements 208 in the different states have the same color, but different brightness levels as discussed above. In another embodiment, elements 208 in different states have two or more different colors. For example, elements 208 in the ON state may have a different color than elements 208 in the DYING state. In some embodiments, elements 208 in the DYING state may change color over time in addition to and/or instead of changing brightness over time as discussed above.

In some embodiments, elements 208 may have different sizes that correspond to the brightness level. For example, in an embodiment, the diameter of an element 208 may correspond to a brightness level of the element. As an illustrative example, in the DYING state, the brightness and the diameter of an element 208 gradually increase from the medium level of brightness to a maximum level of brightness from the set of brightness levels and from a medium diameter to a maximum diameter from a set of diameters. Then, the brightness and the diameter of an element 208 may gradually decrease until reaching the minimum level of brightness and a minimum diameter, in an embodiment.

Figure 3B:
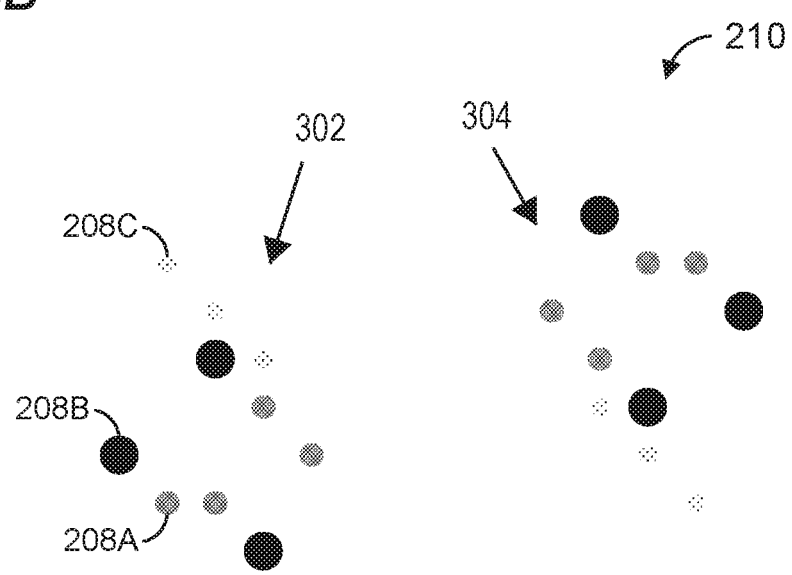
FIG. 3B is an illustrative example of the visual display format of FIG. 3A with various visual elements in the different states.

FIG. 3B is an illustrative example of the visual display format 210 of FIG. 3A with various elements 208 in the different states discussed above. For instance, most of the elements 208 are in the OFF state and are not visible. Some of the elements 208, such as element 208A, are in the ON state and are at a medium brightness level and medium diameter. Also, some of the elements 208, such as the elements 208B and 208C, are in the DYING state. Some of the elements 208 that are in the dying state, such as the element 208B, are at a maximum brightness level and maximum diameter, while other of the elements 208 that are in the dying state, such as the element 208C, are at a brightness level below that of elements 208 in the ON state (e.g., like element 208A) and a diameter less than that of elements in the ON state. For example, the element 208C previously reached the highest brightness level and has already faded to a brightness level below medium. The brightness of the element 208C will subsequently fade further and the element 208C will eventually transition to the OFF state.

As discussed above, an algorithm is utilized to change states of the different elements 208 over time such that the changing brightness levels of the elements 208 over time results in a visual display that exhibits both order and apparent randomness, unpredictability and/or complexity. In some embodiments, a cellular automaton is utilized to change states of the elements 208. In some embodiments, a cellular automaton is utilized, such as described in Stephen Wolfram, *A New Kind of Science*, Wolfram Media, Inc. (2002). *A New Kind of Science* also describes other examples of recursive systems that may be used including "mobile automata," "generalized mobile automata," "Turing machines," "substitution systems," "sequential substitution systems," "tag systems," "cyclic tag systems," "register machines," "symbolic systems," systems based on numerical operations, iterated maps, etc. Examples of other recursive systems that may be used include pseudorandom number generators, random walks, Markov chains, etc. Chapters 3-6 of *A New Kind of Science* are hereby incorporated by reference herein.

As further described in *A New Kind of Science*, relatively simple recursive systems (e.g., simple computer programs such as cellular automata) may be used to generate complex outputs. For example, the rule 110 cellular automaton, which acts locally on a string of 0s and 1s in a manner that can be specified by 8 binary digits, and which can be executed as a single short line of computer code, is known to be capable of universal computation—meaning that it could in principle be programmed to execute any finite algorithm, by being fed a suitable initial condition of 0s and 1s. Moreover, all types of recursive systems mentioned above are known to exhibit so-called "class 4 behavior" (as described in *A New Kind of Science*). Class 4 behavior occurs in subsets of all types of recursive systems mentioned above and produces organized, structured patterns that significantly differ both from random and purely repetitive patterns. The combination of inherent small scale structure and overall complexity shown by class 4 behaviors make formal systems exhibiting it promising places to find algorithms that generate interesting visual displays. As will be understood by those of ordinary skill in the art, however, other and potentially more complex recursive systems may also be utilized to generate visual displays.

Different visual displays are obtained by choosing different initial conditions for the same algorithm (e.g., cellular automaton), in some embodiments. Different visual displays are obtained by choosing different algorithms (e.g., cellular automata), in some embodiments. Different visual displays are obtained by choosing different initial conditions and different algorithms (e.g., cellular automaton), in some embodiments.

In some scenarios (e.g., with certain combinations of initial conditions and algorithms), the visual display will eventually become uninteresting over time. For example, all of the elements 208 may end up and remain in the OFF state. In some embodiments, the visual display module may be configured to detect, while the visual display is being rendered, when the visual display has become visually uninteresting. For example, the visual display module may be configured to detect when some suitable percentage of elements have become stuck in a state (e.g., the elements have remained in the state for a threshold length of time). When it is determined that the visual display has become visually uninteresting, the visual display module may be configured to restart the algorithm with the original initial conditions, restart the algorithm with new initial conditions, etc.

Although in the example of FIG. 3A, each element can take on one of three states, in other embodiments, each element can take on two, four, five, six, etc. states.

Figure 4:
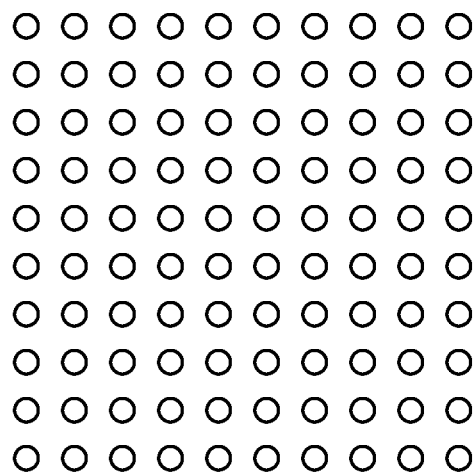
FIG. 4 is a diagram of another example visual display format, according to another embodiment.
Figure 5:
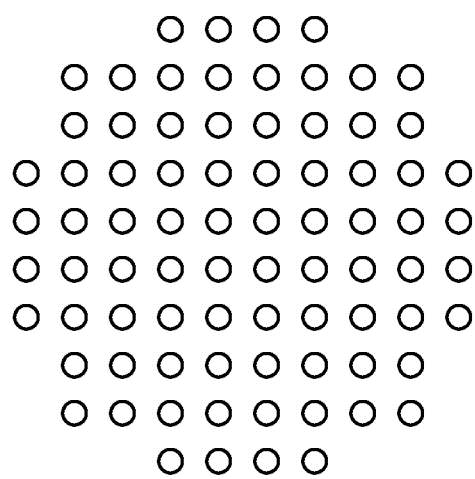
FIG. 5 is a diagram of yet another example visual display format, according to another embodiment.

Although in the example of FIG. 3A, the elements 208 are arranged in a rectangle, elements are arranged in other shapes as well. For example, FIG. 4 is a diagram of an example visual display format 250 that is utilized is some embodiments. The visual display format 250 includes a plurality of elements similar to the arrangement of FIG. 3A, but arranged in a square array. Similarly, FIG. 5 is a diagram of another example visual display format 280 that is utilized is some embodiments. The visual display format 280 includes a plurality of elements similar to the arrangement of FIG. 3A, but arranged in a generally circular shape. In other embodiments, an array of elements is arranged in another suitable shape such as a diamond, a triangle, an octagon, etc.

Figure 6:
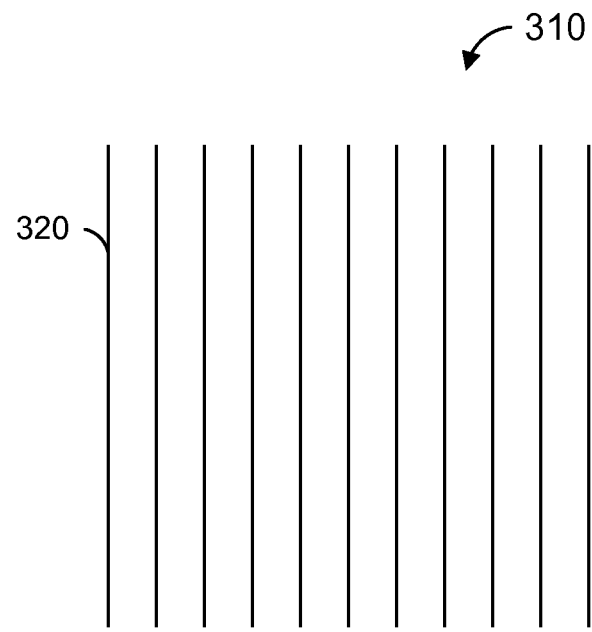
FIG. 6 is a diagram of still another example visual display format, according to another embodiment.

FIG. 6 is a diagram of another example visual display format 310 that is utilized is another embodiment. The visual display format 310 includes a plurality of elements 320 arranged in an array. Each element 320 is generally in the shape of a line. In an embodiment, each element 320 can be in one of a plurality of states, and an algorithm is utilized to change states of the elements 320 over time such that display 310 exhibits both order and apparent randomness or complexity (e.g., within the visual display 310, there may be localized structures that appear ordered and simple, but such structures may move, change and/or interact with other structures in complicated ways that appear random or unexpected), in some embodiments. In an embodiment, different states may correspond to different brightness levels. In an embodiment, different states may correspond to different colors. In an embodiment, different states may correspond to different line thicknesses. In various embodiments, different states may correspond to different brightness levels, different colors, and/or different line thicknesses.

Figure 7:
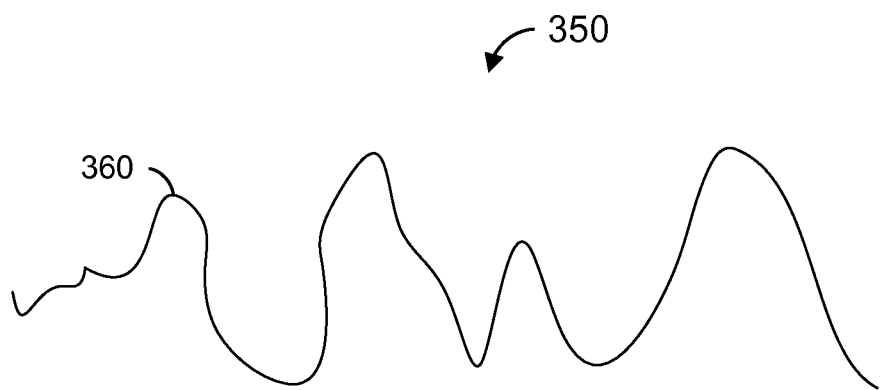
FIG. 7 is a diagram of yet another example visual display format, according to another embodiment.

FIG. 7 is a diagram of another example visual display format 350 that is utilized is another embodiment. The visual display format 350 includes a line 360. An algorithm is utilized to change the shape of the line 360 over time such that the line 360 exhibits both order and apparent randomness or complexity (e.g., within the visual display 310, there may be localized structures that appear ordered and simple, but such structures may move, change and/or interact with other structures in complicated ways that appear random or unexpected), in some embodiments. In an embodiment, different portions of the line may have oscillations at different frequencies, different amplitudes, etc., that change over time as specified by the algorithm.

In other embodiments, the visual display may be generated using other suitable rules and initial conditions. For example, other suitable rules include fractals, graph interactions, etc., in various embodiments. In one embodiment, visual displays are generated using different images as different initial conditions, and using image manipulation or processing rules to cause each image to vary over time. As another example, visual displays are generated using a rule that governs how particles interact with one another and the visual display depicts particles that interact as governed by the rule, in an embodiment. As another example, visual displays are generated using a rule that corresponds to rules of physics and the visual display depicts objects that interact as governed by the rule, in an embodiment.

Figure 8:
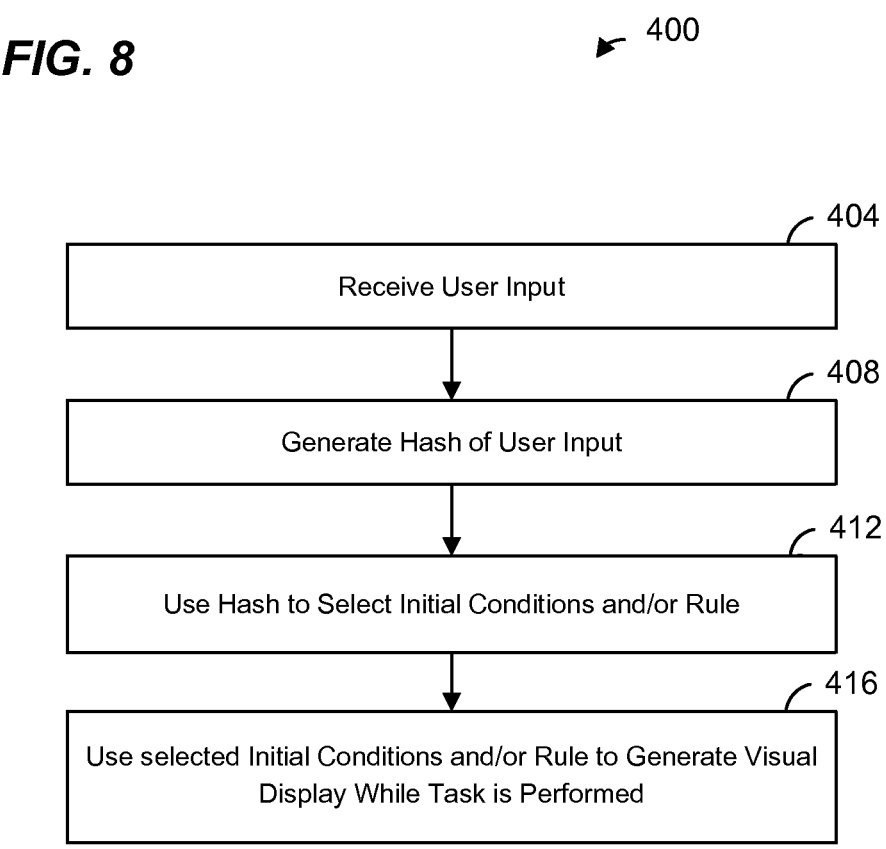
FIG. 8 is a flow diagram of an example method for rendering a visual display to mitigate latency, according to an embodiment.

FIG. 8 is a flow diagram of an example method 400 for generating and rendering a visual display such as discussed above, according to an embodiment. The method 400 may be implemented by the mobile device 100 of FIG. 1, in an embodiment. The method 400 may be implemented by the user computer 154 and/or the server system 162 of FIG. 2, in an embodiment. For example, some blocks of FIG. 8 may be implemented, at least partially, by the client display module 178 and/or the application 180 of the user computer 154, while other blocks may be implemented, at least partially, by the server application 194 and/or the server display module 198 of the server system 162. Although FIG. 8 is described with reference to FIG. 2 for ease of explanation, the method 400 may be implemented by other suitable devices and/or systems in various embodiments.

At block 404, a user input is received. The user input may be associated with a query to an answering and/or computational system. In an embodiment, the user input is a natural language query. In another embodiment, the user input is a structured query (i.e., in a structured format). The user input may be associated with a query to an Internet search engine, a database search engine, etc. In other embodiments, the user input may be a request for a web page (e.g., including one or more of a uniform resource locator (URL), an Internet Protocol (IP) address, a file transport protocol (FTP) address, a port number, a path, etc.).

At block 408, a hash function is applied to the user input to generate a hash value. Any suitable hash function may be utilized.

At block 412, the hash value generated at block 408 is utilized to select initial conditions and/or an algorithm (or rule) for generating a visual display. For example, the hash value may be mapped (using a mapping function) to initial conditions in a set of allowed initial conditions. Similarly, the hash value may be mapped (using a mapping function) to an algorithm or rule in a set of allowed algorithm or rules. In one embodiment, the same rule is utilized, but the hash value is utilized to select initial conditions. In another embodiment, the same initial conditions are utilized, but the hash value is utilized to select a rule. In another embodiment, the hash value is utilized to select both the initial conditions and the rule. In another embodiment, different hash functions are utilized to generate a first hash value for selecting initial conditions, and a second hash value for selecting a rule.

The algorithm for generating the visual display may be a cellular automaton, in an embodiment. In other embodiments, other suitable algorithms, such as described above, may be utilized.

In an embodiment, initial conditions and/or algorithms are pre-screened so that only initial conditions and/or algorithms that result in visually interesting visual displays are included in the set of initial conditions and/or the set of algorithms. In other embodiments, initial conditions and/or algorithms are pre-analyzed so that only initial conditions and/or algorithms that, with a suitably high probability (e.g., 80%, 85%, 90%, 95%, 97%, 99%, etc.), result in visually interesting visual displays are included in the set of initial conditions and/or the set of algorithms.

At block 416, the initial conditions and/or rule selected at block 412 is utilized to generate a visual display while a task is being performed. As discussed above, in some scenarios (e.g., with certain combinations of initial conditions and algorithms), the visual display will eventually become uninteresting over time. For example, referring to FIG. 3A, all of the elements 208 may end up and remain in the OFF state at some point in time. In some embodiments, the method 400 optionally may include detecting, while the visual display is being rendered, when the visual display has become visually uninteresting. For example, it may be detected when some suitable percentage of elements (e.g., 70%, 75%, 80%, 85%, 90%, etc.) have become stuck in a state (e.g., the elements have remained in the state for a suitable threshold length of time, or it is known, because of the algorithm being utilized, that an element will not subsequently change state, etc.). When it is determined that the visual display has become visually uninteresting, the method 400 may optionally include restarting the algorithm with the original initial conditions, restart the algorithm with new initial conditions, etc.

In one embodiment, blocks 404-412 are implemented at the server system 162. For example, at block 404, the server system 162 may receive user input in connection with a request to perform a computation, an Internet search, a database search, etc. The server display module 198 of the server system 162 may then generate a hash of the user input (block 408) and use the hash value to select initial conditions and/or a rule for generating the visual display.

The server system 162 next transmits the selected initial conditions and/or rule to the user computer 154. The transmitted initial conditions and/or a rule may include an indication of a rule to be utilized, in an embodiment. The transmitted initial conditions and/or a rule may include the rule itself, in an embodiment. For example, the transmitted rule may comprise a script, such as JavaScript, in an embodiment.

The client display module 178 of the user computer 154 then utilizes the selected initial conditions and/or rule to generate and render the visual display while the server application 194 of the server system 162 performs the requested task. The client display module 178 may be implemented in a scripting language such as JavaScript, in an embodiment. The client display module 178 may be provided to the user computer 154 by the server system 162 (or by another server system), such as in a web page, as a mobile app, etc. When a rule is not selected at block 412, the client display module 178 may be configured to utilize a pre-configured or already provided rule as well as the selected initial conditions to generate the visual display.

In other embodiments, blocks 404, 408, and 416 are implemented at the user computer 154 while block 412 is implemented at the server system 412. For example, the user computer 154 may transmit to the server system 162 the hash value generated at block 408. The server system 162 may then use the hash value to select initial conditions and/or a rule for generating the visual display. The server system 162 next transmits the selected initial conditions and/or rule to the user computer 154.

In other embodiments, all of blocks 404-416 are implemented at the user computer 154. In other embodiments, all of blocks 404-416 are implemented at the server system 162. For example, the sever system 162 may generate the visual display and transmit image data to the user computer 154, and the user computer 154 renders the image data on the display 172. Many other variations are contemplated. For example, one or more blocks in may be omitted, additional blocks may be added, etc.

As another example, the block 408 may be omitted, and block 412 may be modified to select the initial conditions and/or rule based on a random or pseudorandom selection, in an embodiment. As yet another example, block 408 may comprise generate the hash value based on other information in addition to or instead of the user input, such as a time of day.

Figure 9:
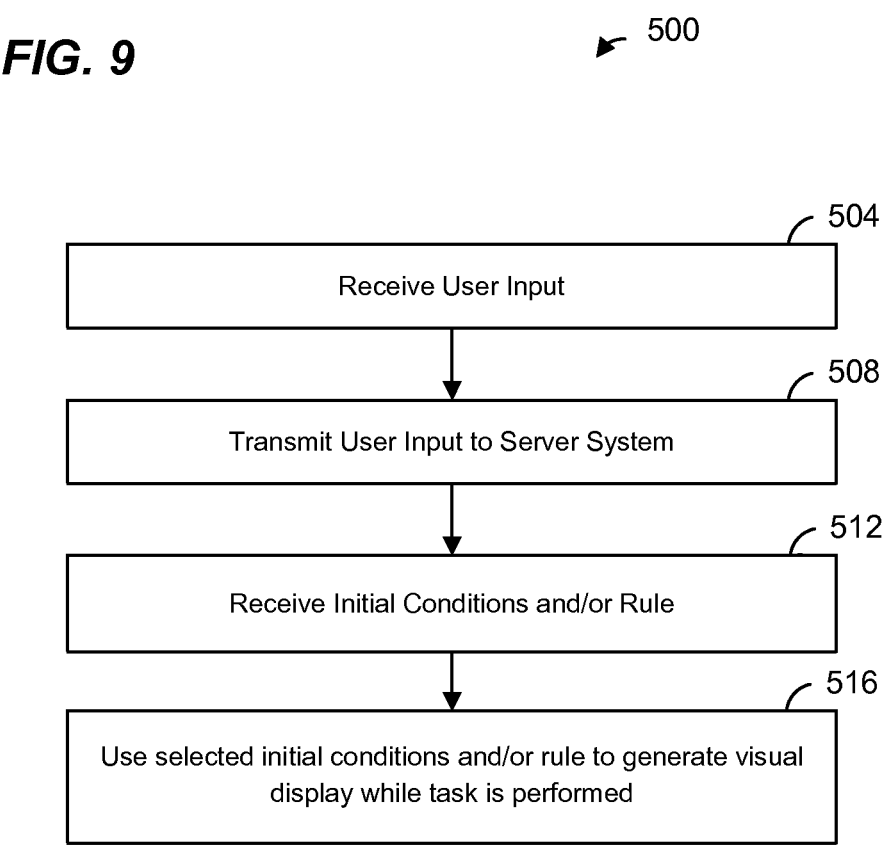
FIG. 9 is a flow diagram of another example method for rendering a visual display to mitigate latency, according to an embodiment.

FIG. 9 is a flow diagram of an example method 500 for generating and rendering a visual display such as discussed above, according to an embodiment. The method 500 may be implemented by the mobile device 100 of FIG. 1, in an embodiment. The method 500 may be implemented by the user computer 154, in another embodiment. For example, at least some of the blocks of FIG. 9 may be implemented, at least partially, by the client display module 178 and/or the application 180 of the user computer 154. Although FIG. 9 is described with reference to FIG. 2 for ease of explanation, the method 500 may be implemented by other suitable devices and/or systems in various embodiments.

At block 504, a user input is received. The user input may be associated with a query to an answering and/or computational system. In an embodiment, the user input is a natural language query. In another embodiment, the user input is a structured query (i.e., in a structured format). The user input may be associated with a query to an Internet search engine, a database search engine, etc. In some embodiments, the user input is received via the input device 174 of the user computer 154. In other embodiments, the user input may be a request for a web page (e.g., including one or more of a uniform resource locator (URL), an Internet Protocol (IP) address, a file transport protocol (FTP) address, a port number, a path, etc.).

At block 508, the user input is transmitted to the server system 162. At block 512, initial conditions and/or a rule for generating the visual display is received from the server system 162. The initial conditions and/or a rule for generating the visual display may be received responsive to transmitting the user input at block 508, in an embodiment. The received initial conditions and/or a rule may include an indication of a rule to be utilized, in an embodiment. The received initial conditions and/or a rule may include the rule itself, in an embodiment. For example, the received rule may comprise a script, such as JavaScript, in an embodiment.

At block 516, the client display module 178 of the user computer 154 utilizes the selected initial conditions and/or rule to generate and render the visual display while a task is being performed (e.g., by the user computer 154, by the server system 162, another server system, etc.). The client display module 178 may be implemented in a scripting language such as JavaScript, in an embodiment. The client display module 178 may be provided to the user computer 154 by the server system 162 (or by another server system), such as in a web page, as a mobile app, etc. When a rule is not selected at block 412, the client display module 178 may be configured to utilize a pre-configured or already provided rule as well as the selected initial conditions to generate the visual display.

In the embodiments describe with respect to FIGS. 8 and 9, rendering of the visual display may be ended when the task has been performed. For example, if the task relates to a request for information, rendering of the visual display may be ended when the requested information is received, and the requested information may be displayed on a display device.

Although various embodiments and examples were discussed above in the context of visual displays, in other embodiments, audio signals are additionally or alternatively rendered while a task is being performed in a manner similar to the techniques discussed above. For example, techniques for generating audio signals that may be utilized are described in U.S. Pat. No. 7,560,636, which is hereby incorporated by reference herein. In embodiments in which an audio signal is rendered, the computing device may include an audio signal generator (e.g., a sound card) coupled to a sound generator such as a speaker. The one or more processors may be coupled to the audio signal generator and may send generated audio signals to the audio signal generator for rendering using the sound generator (e.g., the speaker).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
    electronically communicating between a computing device and a server via a communication network;
    receiving, at the computing device, respective user input associated with different tasks to be performed;
    transmitting, by the computing device, the respective user input to the server via the communication network;
    receiving, from the server, a rule for generating a visual display;
    determining, at the computing device, different respective initial conditions for the rule that are related to the respective tasks;
    generating, with the computing device, a plurality of different visual displays respectively corresponding to the different tasks using the rule and the different respective initial conditions; and
    rendering on a display device each of the visual displays while each respective task is being performed;
    wherein rendering each visual display includes:
        displaying, on the display device, a plurality of identical visual elements arranged in a visual array, the visual elements being spaced apart from each other, the visual elements being separately controllable to be displayed in different states from among a same plurality of states associated with at least one visual characteristic of the visual elements, the plurality of different states including i) a first state corresponding to displaying a respective visual element having a first width or diameter from among a set of multiple widths or diameters and at a first brightness level from among a set of multiple brightness levels, the set of widths or diameters including a minimum width or diameter, a maximum width or diameter, and one or more other widths or diameters between the minimum width or diameter and the maximum width or diameter and the set of brightness levels including a minimum brightness level, ii) a second state corresponding to displaying the respective visual element having a second width or diameter from among the set of widths or diameters and at a second brightness level from among the set of brightness levels, the second brightness level being greater than the minimum brightness level, and iii) a third state corresponding to displaying the respective visual element having a third width or diameter from among the set of widths or diameters and at a third brightness level from among the set of brightness levels, so that a) brightness of the respective visual element varies over time amongst different brightness levels in the set of brightness levels and b) a width or diameter of the respective visual element as displayed varies over time, and
        applying the rule to separately change the respective states of the visual elements over time as the visual display is rendered such that i) a first set of multiple visual elements are in the third state at a first time and are separated by visual elements in the first state, and ii) a different second set of multiple visual elements are in the third state at a second time and are separated by visual elements in the first state, and
    wherein each visual display is configured to engage the user of the visual display in order to distract the viewer from the amount of time passing while the respective task is being performed and
    ending the rendering of the respective visual display in connection with completion of the respective task.

2. The method according to claim 1, wherein determining the different respective initial conditions comprises selecting, with the computing device and for each visual display to be generated, the different respective initial conditions for the rule for displaying the visual elements arranged in the visual display format based on respective data associated with the respective tasks to be performed.

3. The method according to claim 2, wherein selecting the initial conditions for each visual display is based on respective user input indicating the respective task to be performed.

4. The method according to claim 2, wherein the initial conditions are randomly or pseudo-randomly selected for each visual display.

5. The method according to claim 1, wherein selecting the initial conditions for each visual display comprises:
    applying a hash function to the respective user input to generate a respective hash value; and
    selecting the initial conditions for the visual display based on the respective hash value.

6. The method according to claim 1, wherein determining the different respective initial conditions comprises, for each visual display to be generated, electronically receiving, from the server via the communication network, the initial conditions for displaying the visual elements arranged in the visual display format.

7. The method according to claim 1, wherein the task is (i) a computing task performed by the computing device or (ii) performed by the server separate from the computing device.

8. The method according to claim 1, wherein the visual array is one of (i) a rectangular array, (ii) a square array, and (iii) a circular array.

9. The method according to claim 1, wherein all of the visual displays are generated using the same rule.

10. The method according to claim 1, wherein at least some of the visual displays are generated using different rules.

11. The method according to claim 1, wherein the rule comprises a cellular automaton.

12. The method according to claim 1, wherein the user input corresponds to a query;
    wherein the task is to generate a response to the query; and
    wherein one or both of (i) the rule and (ii) the initial conditions are generated using the query.

13. The method according to claim 12, wherein the task is performed by the server separate from the computing device.

14. The method according to claim 1, wherein the third state corresponds to varying a color of the respective visual element as displayed over time.

15. The method according to claim 1, wherein the visual array is a two-dimensional array.

16. An apparatus, comprising:
a user input device configured to receive respective user inputs associated with different tasks to be performed;
a network interface device configured to (i) electronically communicate with a server and via a network, (ii) transmit the respective user input to the server via the network, and (iii) receive, from the server, a rule for generating a visual display;
a hardware processor coupled to the user input device and the network interface device, the hardware processor configured to:
determine different respective initial conditions for the rule that are related to the respective tasks, and
generate a plurality of different visual displays corresponding to the different respective tasks using the rule and the determined different respective initial conditions; and
wherein each visual display is to be rendered on a display device while each respective task is being performed;
wherein, for each visual display to be rendered, a plurality of identical visual elements are to be displayed in a visual array, the visual elements being spaced apart from each other, the visual elements being separately controllable to be displayed in different states from among a same plurality of states associated with at least one visual characteristic of the visual elements, the plurality of different states including i) a first state corresponding to displaying a respective visual element having a first width or diameter from among a set of multiple widths or diameters and at a first brightness level from among a set of multiple brightness levels, the set of widths or diameters including a minimum width or diameter, a maximum width or diameter, and one or more other widths or diameters between the minimum width or diameter and the maximum width or diameter and the set of brightness levels including a minimum brightness level, ii) a second state corresponding to displaying the respective visual element having a second width or diameter from among the set of diameters at a second brightness level from among the set of brightness levels, the second brightness level being greater than the minimum brightness level, and iii) a third state corresponding to displaying the respective visual element having a third width or diameter from among the set of widths or diameters and at a third brightness level from among the set of brightness levels, so that a) brightness of the respective visual element varies over time amongst different brightness levels in the set of brightness levels and b) a width or diameter of the respective visual element as displayed varies over time;
wherein the rule is to be applied to separately change the respective states of the visual elements over time as the visual display is rendered such that i) a first set of multiple visual elements are in the third state at a first time and are separated by visual elements in the first state, and ii) a different second set of multiple visual elements are in the third state at a second time and are separated by visual elements in the first state; and
wherein each visual display is configured to engage a viewer of the visual display in order to distract the viewer from the amount of time passing while the respective task is being performed; and
wherein the hardware processor is configured to end the rendering of the respective visual display in connection with completion of the respective task.

17. The apparatus according to claim 16, wherein the hardware processor is configured to select, for each visual display to be generated, the different respective initial conditions for the rule for displaying the visual elements in the visual display format based on respective data associated with the respective tasks to be performed.

18. The apparatus according to claim 17, wherein the hardware processor is configured to select the initial conditions for each visual display based on respective user input indicating the respective task to be performed.

19. The apparatus according to claim 17, wherein the hardware processor is configured to:
apply a hash function to the respective user input to generate a respective hash value, and
select the initial conditions for the visual display based on the respective hash value.

20. The apparatus according to claim 17, wherein the hardware processor is configured to select, for each visual display, the initial conditions randomly or pseudo-randomly.

21. The apparatus according to claim 16,
wherein the hardware processor is configured to utilize, for generating each visual display, initial conditions for the recursive algorithm for displaying the visual elements in the visual display format electronically received from the server via the communication network.

22. The apparatus according to claim 16, further comprising the display device.

23. The apparatus according to claim 16, wherein the hardware processor comprises:
one or more memories to store machine readable instructions; and
one or more processors configured to execute machine readable instructions stored in the one or more memories.

24. The apparatus according to claim 16, wherein the user input corresponds to is a query;
wherein the task is to generate a response to the query; and
wherein the initial conditions are generated using the query.

25. The apparatus according to claim 24, wherein the task is performed by the server separate from the computing device.

26. The apparatus according to claim 16, wherein the third state corresponds to varying a color of the respective visual element as displayed over time.

* * * * *